July 18, 1950     C. G. BERGMANN     2,515,289
ADJUSTABLE COLLET STOP
Filed Feb. 6, 1948
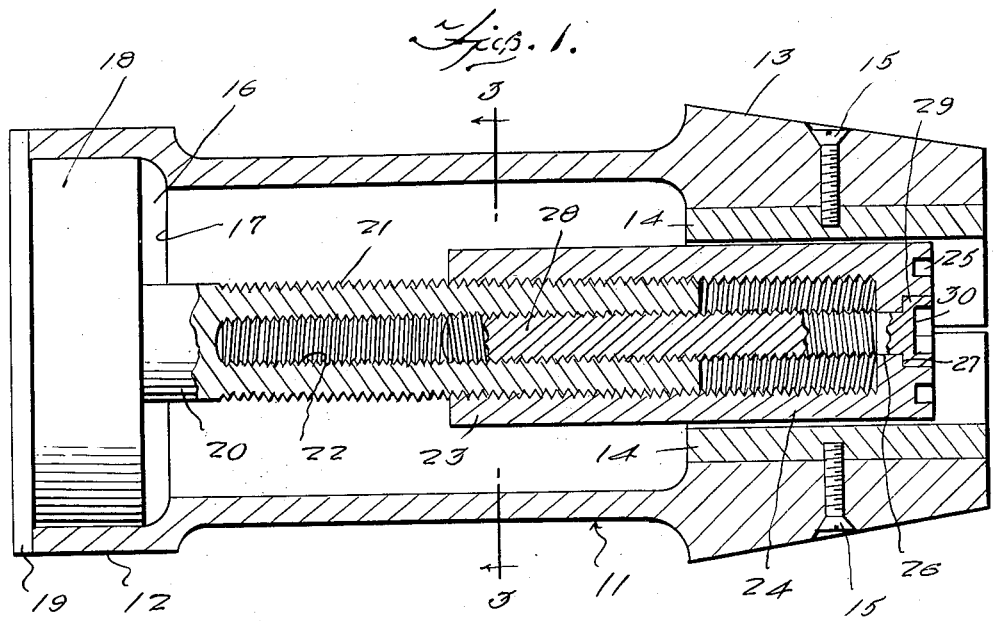
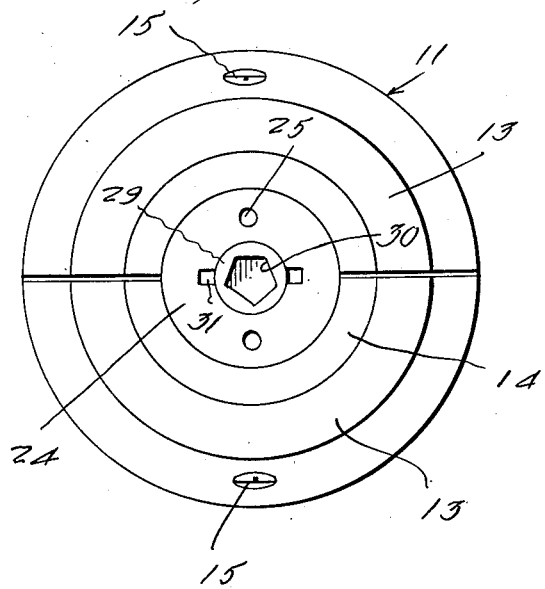
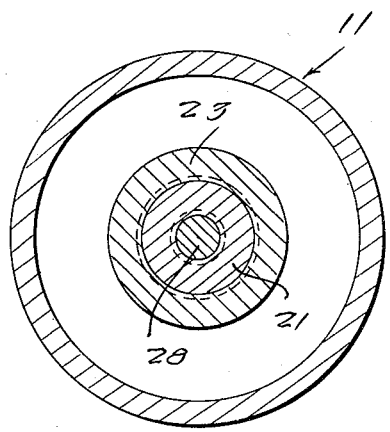
INVENTOR.
Charles G. Bergmann
BY
McMorrow, Berman & Davidson
ATTORNEYS

Patented July 18, 1950

2,515,289

UNITED STATES PATENT OFFICE 2,515,289

ADJUSTABLE COLLET STOP

Charles G. Bergmann, Phillipsburg, N. J.

Application February 6, 1948, Serial No. 6,785

2 Claims. (Cl. 279—46)

This invention relates to collets, and more particularly to an adjustable collet stop for use with turret lathe or screw machine collets.

A main object of the invention is to provide a novel and improved adjustable collet stop which is simple in construction, easy to install, and which may be adjusted without removing the collet from the turret or spindle in which it is mounted.

A further object of the invention is to provide an improved adjustable collet stop which involves only a few parts, is very easy to adjust and which remains securely fixed until a change of adjustment is made.

Further objects and advantages of the invention will become apparent from the following description and claims, and from the accompanying drawings, wherein:

Figure 1 is a longitudinal cross-sectional view taken through a turret lathe collet provided with an adjustable stop device constructed in accordance with the present invention.

Figure 2 is a front end view of the collet of Figure 1.

Figure 3 is a vertical transverse cross-sectional view taken on line 3—3 of Figure 1.

Referring to the drawings, 11 designates a conventional collet, such as is commonly employed on a turret lathe, the collet having a rear end portion 12 which is received in and secured to the lathe turret, and a front jaw portion 13 which may be longitudinally split to allow the jaw portion to exert a clamping action on a work piece or tool inserted in the front end of the collet. The elements of the jaw portion 13 are provided with internal pad members 14 secured to said elements by machine screws 15.

The rear portion 12 of collet 11 is somewhat enlarged in diameter as compared with the intermediate portion thereof and defines a cylindrical rear cavity 16 in the collet, terminating at an annular shoulder 17. Fitted tightly into cavity 16 is a cylindrical plug member 18 formed with an annular end flange 19 which abuts and is substantially flush with the external surface of collet rear portion 12. Plug member 18 carries an axial stem 20 formed with external threads 21, said stem being axially bored and formed with internal threads 22. Threaded on said external threads 21 is a cap member 23, said cap member being cylindrical in external contour and being receivable between the pads 14 in a position of longitudinal adjustment depending upon the extent to which it is screwed onto stem 20. The end wall 24 of said cap member is formed with diametrically opposed recesses 25, 25 for engagement by the fingers of a capstan wrench, so that the cap member may be rotated by said wrench to a desired position of adjustment between the jaw pads 14, 14.

End wall 24 of cap member 23 is formed with an axial opening 26 and is counterbored at 27. Extending through said opening 26 and threadedly engaging the internal threads 22 of stem 20 is a locking screw 28 having a cylindrical head 29 which fits rotatably into the counterbore 27. Head 29 is formed with a pentagonal recess 30 for engagement by a suitable tool, whereby screw 28 may be rotated in the threads 22. When screw 28 is tightened, cap member 23 is locked with respect to stem 20 in a desired position of adjustment between the collet jaw pads 14, 14. To change the position of cap member 23, screw 28 is loosened and cap member 23 is moved to its new position by means of a capstan wrench, as above described. Screw 28 is then again tightened, whereby cap member 23 is locked in its new position.

It is thus apparent that the cap member 23, which acts as a stop for limiting the distance of inward movement of a work piece or tool into the collet, may be adjusted without removing the collet from the turret or spindle in which it is secured, and that the adjustment thereof may be quickly and easily performed.

The plug member 18 is preferably tightly-fitted into the rear end portion 12 of the collet so that the stop device is a permanent part of the collet. When the stop device is not needed, the cap member 23 may be readily unthreaded from stem 20 by first loosening and removing the locking screw 28.

Opposed recesses 31, 31 are formed in the end wall 24 of cap member 23 so that a screw driver may be engaged therewith, if so desired, to rotate the cap member when the locking screw 28 is removed.

While a specific embodiment of an adjustable collet stop has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An adjustable stop for a collet comprising a plug member fitting tightly into the rear end portion of the collet and having an annular end flange adapted to abut the rear end of the collet, an axial externally threaded stem extending forwardly through the collet and fixed at one end on said plug, a cylindrical cap member having an axial bore therein threaded onto said stem, whereby said cap member may be adjustably positioned along the length of said stem between the jaws of the collet, and means for locking said cap member to said stem in an adjusted position thereof.

2. An adjustable stop for a collet comprising a plug member fitting tightly into the rear end portion of the collet and having an end flange adapted to abut the rear end of the collet, an axial tubular stem extending forwardly through the collet fixed at the rear end on said plug and formed with a forwardly opening axial bore therein, said stem being formed with external and internal threads, a tubular cap member threaded onto said external threads whereby said cap member may be adjustably positioned along the length of said stem between the jaws of the collet, and a headed locking screw extending through the front end wall of the cap member and threadedly engaged with said internal threads, said end wall being counter-bored to receive the head of said locking screw.

CHARLES G. BERGMANN.

REFERENCES CITED

The following references are of record in the file of this patent:

UNITED STATES PATENTS

| Number | Name | Date |
|---|---|---|
| 1,407,213 | Olson | Feb. 21, 1922 |
| 1,416,102 | Lusk | May 16, 1922 |
| 1,562,602 | Trenn | Nov. 24, 1925 |
| 1,816,648 | Gray | July 28, 1931 |